United States Patent
Hayakawa et al.

(10) Patent No.: US 7,544,406 B2
(45) Date of Patent: Jun. 9, 2009

(54) LAMINATE WITH FLUOROPOLYMER FILM AND FILM-FORMING FLUOROPOLYMER

(75) Inventors: Osamu Hayakawa, Shizuoka (JP); Yuqing Liu, Shizuoka (JP); Yuji Mochizuki, Shizuoka (JP)

(73) Assignee: Dupont-Mitsui Fluorochemicals Co Ltd, Tokyo (JP)

( * ) Notice: Subject to any disclaimer, the term of this patent is extended or adjusted under 35 U.S.C. 154(b) by 292 days.

(21) Appl. No.: 11/190,302

(22) Filed: Jul. 27, 2005

(65) Prior Publication Data

US 2007/0026222 A1    Feb. 1, 2007

(51) Int. Cl.
*B32B 1/08* (2006.01)
*B32B 25/20* (2006.01)
*B32B 27/08* (2006.01)

(52) U.S. Cl. .................. 428/36.91; 428/421; 428/422; 428/447

(58) Field of Classification Search ............. 428/36.91, 428/421, 422, 447, 702; 492/53
See application file for complete search history.

(56) References Cited

U.S. PATENT DOCUMENTS

| | | | | |
|---|---|---|---|---|
| 4,970,559 | A * | 11/1990 | Miyabayashi | ............... 399/324 |
| 5,780,552 | A | 7/1998 | Kerbow | |
| 5,918,098 | A * | 6/1999 | Van Bennekom | ........... 399/333 |
| 6,177,196 | B1 | 1/2001 | Brothers et al. | |
| 6,232,372 | B1 * | 5/2001 | Brothers et al. | ............ 523/206 |

FOREIGN PATENT DOCUMENTS

EP         0 901 900 A1    3/1999

* cited by examiner

Primary Examiner—Ramsey Zacharia

(57) ABSTRACT

A functionalized fluoropolymer, preferably with phosphate functionality, can be coated on a metal oxide containing rubber substrate, which coating, after heating, results in a fluoropolymer-rubber substrate laminate without degradation of the rubber, and with good adhesion between the fluoropolymer and the rubber.

17 Claims, No Drawings

LAMINATE WITH FLUOROPOLYMER FILM AND FILM-FORMING FLUOROPOLYMER

BACKGROUND OF THE INVENTION

1. Field of the Invention

The present invention relates to a laminate with a fluoropolymer film that has flexibility while maintaining its heat resistance and non-stickiness, and to a film-forming fluoropolymer. More specifically, this invention relates to a laminate with a fluoropolymer and to a film-forming fluoropolymer appropriate for the rolls of copiers, printers, and the like.

2. Description of Related Art

Rubber (elastomer) rollers have primarily been used in the past for the fusing systems of printers and the like. The surface of these rubber rollers was coated with silicone or with fluoropolymer paint, but durability was a problem.

In some cases, adequate adhesion was not obtained, in others or the elastomer underwent degradation at the temperature (baking temperature) necessary to form a film from a fluoropolymer such as conventional PFA on the rubber substrate. Covering the rubber roller with a PFA tube using a silicone-based adhesive has been attempted, but use at high temperatures posed a problem because of the poor heat resistance of the silicone adhesive.

In U.S. Pat. No. 6,177,196 a fluoropolymer with units derived from phosphorus-containing fluorinated vinyl ethers, and a composition comprising this fluoropolymer and a non-functional fluoropolymer are proposed as a means of forming a satisfactory film by imparting adhesiveness to the fluoropolymer.

U.S. Pat. No. 5,780,552 also proposes an adhesive fluoropolymer having a core/shell structure in which a shell of a fluorine-substituted copolymer that contains the copolymerization units of a functional monomer is formed on a fluoropolymer core.

However, it was found that these fluoropolymers failed to have satisfactory adhesive strength when used to coat rubber rolls, or that the elastomer deteriorated because it could not withstand the necessary baking temperature during application.

There is a need for fluoropolymer films that are capable of adhering firmly to the elastomer substrate, that allow the baking temperature to be reduced to a temperature that can be withstood by the substrate, and that exhibit satisfactory heat resistance during use.

BRIEF SUMMARY OF THE INVENTION

The present invention provides a laminate, comprising a substrate containing a metal oxide, and a functional group-containing fluoropolymer coating layer formed thereon.

The present invention further provides film-forming fluoropolymer composition wherein a phosphate group-containing fluoropolymer is admixed into a copolymer of tetrafluoroethylene with at least one monomer selected from the group consisting of perfluoro(alkyl vinyl ether) and perfluoroalkyl vinyl, said at least one monomer being about 3 to 15 mol % of said copolymer of tetrafluoroethylene, in an amount of about 30 to 80 wt % in relation to the copolymer.

The present invention provides a fluoropolymer that has flexibility while maintaining heat resistance and non-stickiness, and that is suitable for forming films on substrates such as the fuser rolls/belts and pressure rolls/belts of copiers, printers, and the like.

The present invention provides a film-forming fluoropolymer that adheres firmly to the substrate when baked at a temperature that does not result in deterioration of the elastomer substrate, and that maintains satisfactory heat resistance during use.

The present invention provides a laminate comprising a substrate containing a metal oxide, and a functional group-containing fluoropolymer coating layer formed thereon.

A preferred embodiment of the present invention is a laminate in which the functional group-containing fluoropolymer is a phosphate group-containing fluoropolymer.

A preferred embodiment of the present invention is a laminate in which the functional group-containing fluoropolymer is a tetrafluoroethylene/trifluorovinyl ether group-containing dihydrogen phosphate ester compound/fluorine-containing comonomer copolymer resin.

A preferred embodiment of the present invention is a laminate in which the phosphate group-containing fluoropolymer is a trifluorovinyl ether group-containing dihydrogen phosphate ester compound copolymer resin expressed by formula (1) below.

A preferred embodiment of the present invention is a laminate in which the fluorine-containing comonomer is a perfluoro(alkyl vinyl ether) or perfluoroalkyl vinyl.

A preferred embodiment of the present invention is a laminate in which the functional group-containing fluoropolymer is a composition of a functional group-containing fluoropolymer and a fluoropolymer without functional groups.

A preferred embodiment of the present invention is a laminate in which the fluoropolymer without functional groups is a tetrafluoroethylene/perfluoro(alkyl vinyl ether) or perfluoroalkyl vinyl copolymer resin.

The present invention also provides a laminate in which a fluoropolymer layer is formed on the external surface of the aforementioned laminate.

The present invention also provides a film-forming fluoropolymer composition wherein a phosphate group-containing fluoropolymer is admixed into a copolymer resin of a perfluoro(alkyl vinyl ether) or perfluoroalkyl vinyl and tetrafluoroethylene that contains 3 to 15 mol % of the perfluoro (alkyl vinyl ether) or perfluoroalkyl vinyl component, in an amount of 30 to 80 wt % in relation to the copolymer resin.

A preferred embodiment of the film-forming fluoropolymer composition of the present invention is a fluoropolymer composition in which the phosphate group-containing fluoropolymer is a copolymer resin of tetrafluoroethylene, a perfluoro(alkyl vinyl ether) or perfluoroalkyl vinyl, and a dihydrogen phosphate ester compound expressed by formula (1) below, which resin contains the perfluoro(alkyl vinyl ether) or perfluoroalkyl vinyl component in an amount of 3 to 15 mol %.

DETAILED DESCRIPTION OF THE INVENTION

Fluoropolymers according to the present invention are polymers made by polymerizing one or more monomers, at least one of which is a fluoromonomer. A fluoromonomer according to this invention is an olefin, including vinyl ethers containing at least one fluorine atom bonded to a carbon atom. Preferably the fluorine is bonded to a carbon atom which is part of the olefinic double bond. More preferably, at least half of the monovalent atoms bonded to carbon in the fluoromonomer are fluorine atoms, more preferably still at least 75% of the monovalent atoms bonded to carbon in the fluoromonomer are fluorine atoms, and most preferably, all the monovalent atoms bonded to carbon in the fluoromonomer are fluorine atoms. It is preferred that all the monomers used in making the fluoropolymer according to this invention are fluoromonomers. It is further preferred that all the monomers are perfluoromonomers, with the proviso that functional monomers need not be perfluorinated.

The present invention provides a film-forming fluoropolymer that adheres firmly to the substrate, permits coating at a temperature that can be withstood by the substrate, and maintains satisfactory heat resistance during use. By film-forming is meant the that the fluoropolymer in powder or particle form, or in the form of a dispersion, e.g. an aqueous dispersion, can be applied to a substrate, and will on heating sufficiently, coalesce to form a film.

The present invention also provides a fluoropolymer that when applied as a coating can be made to form a film at a temperature that can be withstood by the substrate, adheres firmly to the substrate, and maintains satisfactory heat resistance during use.

The present invention makes it possible to form a fluoropolymer film on the surface of a flexible substrate such as an elastomer and provides a raw material endowed both with flexibility and with the chemical resistance and low frictional property of a fluoropolymer.

The present invention provides a laminate in which a film is formed on a substrate, and also provides a film-forming fluoropolymer that can be used appropriately for the fuser rolls/belts and pressure rolls/belts of copiers, printers, and the like.

The present invention provides a laminate obtained by further applying a fluoropolymer to the external surface of a laminate comprising a substrate and a functional group-containing fluoropolymer coating layer formed on the substrate. Such a laminate can be used at a high temperature, and is therefore suitable as a roller for copiers and the like.

The present invention provides a laminate comprising a substrate containing a metal oxide, and a functional group-containing fluoropolymer coating layer formed on the substrate.

The functional group-containing fluoropolymer in accordance with the present invention will be described first.

Examples of functional groups include esters, alcohols, acids, salts and halides thereof, cyanates, carbamates, and nitrites. Examples of acids include carboxylic acids, acids derived from phosphorus, and acids derived from sulfur.

The functional group-containing fluoropolymer can be obtained, for example, by copolymerizing a functional group-containing fluorinated monomer. Examples of functional group-containing fluorinated monomers include the functional group-containing fluorinated monomers cited in U.S. Pat. Nos. 6,177,196 and 5,780,552. A functional group-containing fluoropolymer can also be obtained by reacting, such as by grafting, such a functional group-containing fluorinated monomer to a fluoropolymer.

Phosphorus-based acids, preferably phosphate groups, are preferred examples of such functional groups.

Trifluorovinyl ethers that contain dihydrogen phosphate ester functionality shown by formula (1) below are preferred examples of fluorinated monomers that have phosphate groups as their functional groups:

$$CF_2=CF(OR)_m(CH_2)OP(O)(OH)_2 \quad (1)$$

(where R is a $C_1$-$C_{20}$ fluorinated hydrocarbon group, m is an integer from 1 to 10, and R may be the same or different when m is 2 or greater.)

In formula (1), R is a $C_1$-$C_{20}$ fluorinated hydrocarbon group, preferably a fluorinated alkylene group.

In formula (1) above, compounds in which (OR) is the following group are preferred examples of the trifluorovinyl ether group-containing dihydrogen phosphate ester compounds of the present invention:

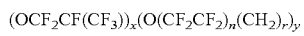

In the formula, x is an integer from 1 to 3, y is an integer from 0 to 3, n is an integer from 0 to 3, and r is an integer from 0 to 3. n and r may be the same or different when y is 2 or greater.

Specific examples of compounds shown by formula (1) include 2,2,3,3,5,6,6,8,9,9-decafluoro-5-trifluoromethyl-4,7-dioxanona-8-en-1-yl dihydrogen phosphate (EVE-P) and 2,2,3,3,4,4,6,7,7-nonafluoro-5-oxahepta-6-en-1-yl dihydrogen phosphate.

It is preferred in the present invention that the fluoropolymer be a copolymer of tetrafluoroethylene (TFE) and at least one type of fluorine-substituted comonomer, the copolymer being obtained by copolymerization in accordance with a conventional method, such as aqueous emulsion polymerization, or polymerization in a solvent such as fluorinated solvent. Examples of such fluorine-substituted comonomers include perfluoroolefins with 3-8 carbon atoms, referred to herein as perfluoroalkyl vinyls, and perfluoro(alkyl vinyl ethers) (PAVE) with 1-5 carbon atoms, which may contain one or more ether oxygens. Copolymer resins of TFE and perfluoro(alkyl vinyl ether) (PFA resins), and copolymer resins of TFE and perfluoroalkyl vinyls are preferred fluoropolymers.

Hexafluoropropylene (HFP), perfluoro(methyl vinyl ether) (PMVE), perfluoro(ethyl vinyl ether) (PEVE), and perfluoro (propyl vinyl ether) (PPVE) are suitable as fluorine-substituted comonomers. Perfluoro(ethyl vinyl ether) (PEVE) and perfluoro(propyl vinyl ether) (PPVE) are more preferred.

The functional group-containing fluoropolymer of the present invention is preferably obtained by copolymerizing a fluorinated monomer that contains the aforementioned functional group units when producing the fluoropolymer by polymerization. It is preferably a copolymer obtained by copolymerizing the aforementioned functional group-containing fluorinated monomer, TFE, and at least one type of fluorine-substituted comonomer in accordance with a conventional method.

Polymerization can be done according to procedures known in the art. These include solution polymerization, wherein the solvent is a fluorocarbon or fluorochlorocarbon. Preferred is aqueous dispersion polymerization such as is described herein in the Examples. The concentration of the polymer in the aqueous medium is from about 10 to 50 wt %, preferably about 20 to 40 wt), and more preferably about 25 to 35 wt %.

The compounds cited above can be given as examples of fluorine-substituted comonomers. Perfluoro(alkyl vinyl ethers) and perfluoroalkyl vinyls are especially preferred.

The melting point of the functional group-containing fluoropolymer of the present invention is preferably about 200-300° C., more preferably about 220-280° C.

When the functional group-containing fluoropolymer of the present invention is a copolymer of TFE, a fluorine-substituted comonomer, and a functional group-containing fluorinated monomer, the amount of the perfluoro(alkyl vinyl ether) and perfluoroalkyl vinyl as fluorine-substituted comonomers is preferably about 3 to 15 mol %, and more preferably about 5 to 12 mol %, in relation to the copolymer. Having the amount of perfluoro(alkyl vinyl ether) and perfluoroalkyl vinyl within the aforementioned range is a preferred embodiment of the present invention because the melting point of the functional group-containing fluoropolymer can then be kept within a range of about 200 to 300° C.

The quantity of fluorinated monomer units that have functional groups is preferably about 0.02 to 5 mol %, more preferably about 0.1 to 2.5 mol %, in relation to the copolymer.

The functional group-containing fluoropolymer of the present invention may be a composition comprising functional group-containing fluoropolymer and fluoropolymer without functional groups described above.

A composition comprising the functional group-containing fluoropolymer and the fluoropolymer without functional groups is a preferred embodiment of the functional group-containing fluoropolymer of the present invention because such a composition makes it possible to adjust the content of functional groups easily and arbitrarily.

The term "functional group-containing fluoropolymer of the present invention" is also sometimes used herein in the sense of a composition comprising a functional group-containing fluoropolymer and a fluoropolymer without functional groups.

When the functional group-containing fluoropolymer of the present invention is a mixture of a functional group-containing fluoropolymer and a fluoropolymer without functional groups as mentioned above, its melting point is preferably about 200-300° C., and more preferably from about 220 to 280° C., so that when the fluoropolymer film is formed on the substrate by heating, the baking temperature will not be so high as to damage the substrate.

The fluoropolymer without functional groups can be selected as is appropriate from among the aforementioned fluoropolymers. TFE/perfluoro(alkyl vinyl ether) copolymer resins and TFE/perfluoroalkyl vinyl copolymer resins among them are preferred.

To achieve the desired melting point, it is preferable to use copolymers in which the fluoropolymer is a TFE/perfluoro(alkyl vinyl ether) copolymer resin or TFE/perfluoroalkyl vinyl copolymer resin, and in which the proportion of the alkyl vinyl ether or alkyl vinyl component is when the fluoropolymer film is formed on the substrate 3 to 15 mol %, and preferably when the fluoropolymer film is formed on the substrate 5 to 12 mol %, in relation to the copolymer resin. Copolymer resins of TFE and a perfluoro(alkyl vinyl ether) or perfluoroalkyl vinyl that contain when the fluoropolymer film is formed on the substrate 3 to 15 mol % of the alkyl vinyl ether or alkyl vinyl component are therefore preferred embodiments of the fluoropolymer of the present invention.

When the functional group-containing fluoropolymer of the present invention is a composition comprising a functional group-containing fluoropolymer and a fluoropolymer without functional groups as mentioned above, the functional group-containing fluoropolymer is preferably admixed in a proportion of 10 to 100 wt %, preferably of 30 to 80 wt %, in relation to total weight of the composition. The fluoropolymer and functional group-containing fluoropolymer can be mixed by any conventional method, such as by melt mixing using a kneader, extruder, or roll mill. If the polymers are made by aqueous emulsion or dispersion polymerization, the aqueous dispersions may be mixed before the polymers are isolated from the aqueous medium.

Isolation of the polymer may not be necessary if it is desired to apply the polymer to substrate by such coating methods as spraying and roll-coating. In such cases the polymer dispersion (or solution in the case of solvent-polymerization, recognizing that the polymer may not be completely dissolved in solvent) can be used directly, or with adjustment of concentrations and additions of thickeners and other agents to facilitate coating.

The admixture of the fluoropolymer and the functional group-containing fluoropolymer can also be accomplished by forming particles that have a core/shell structure as cited in U.S. Pat. No. 5,780,552. When particles with such a core/shell structure are formed, the shell comprises the functional group-containing fluoropolymer, and the core is the fluoropolymer.

Particles that have such a core/shell structure can be manufactured through a polymerization process that produces fluoropolymer. In further detail, a fluoropolymer is produced as the core by copolymerizing tetrafluoroethylene (TFE) with a perfluoro(alkyl vinyl ether), perfluoroalkyl vinyl, or another fluorine-substituted comonomer, and polymer particles that have a shell that contains a fluorinated monomer with functional groups can be produced by adding and further copolymerizing a fluorinated monomer that has the aforementioned functional groups in a stage near the end of copolymerization. Such copolymerization can be carried out by dispersion polymerization, emulsion polymerization, or suspension polymerization.

The particles that have a core/shell structure obtained in this way are also a preferred embodiment of the functional group-containing fluoropolymer of the present invention. The quantities of the fluoropolymer and functional group-containing fluoropolymer produced can be calculated from the quantities of monomers polymerized when particles with a core/shell structure are produced by polymerization.

The overall composition and content of the particles with a core/shell structure can be determined by $^{19}$F-NMR, and the melting point can be measured by means of differential scanning calorimetry (DSC).

The functional group-containing fluoropolymer of the present invention can be used as a film-forming fluoropolymer.

A preferred film-forming fluoropolymer of the present invention is a functional-group containing fluoropolymer composition obtained by admixing a phosphate group-containing fluoropolymer into a copolymer resin of a perfluoro(alkyl vinyl ether) or perfluoroalkyl vinyl and TFE that contains about 3 to 15 mol % of the perfluoro(alkyl vinyl ether) or perfluoroalkyl vinyl component, in an amount of about 30 to 80 wt % in relation to the copolymer resin.

A more preferred embodiment of the film-forming fluoropolymer of the present invention is a fluoropolymer composition in which the phosphate group-containing fluoropolymer in the aforementioned film-forming fluoropolymer is a copolymer resin of TFE, a perfluoro(alkyl vinyl ether) or perfluoroalkyl vinyl, and a dihydrogen phosphate ester compound expressed by formula (1), which resin contains about 3 to 15 mol % of the perfluoro(alkyl vinyl ether) or perfluoroalkyl vinyl compound.

Using the film-forming fluoropolymer of the present invention makes it possible to coat a substrate such as an elastomer with the fluoropolymer without damaging the substrate by overheating, and makes it possible to form a film that has adequate heat resistance during use.

If a primer coating is to be applied (see Examples 1 to 4 and Comparative Example 1), it is thin, about 1 to 10 µm thick (from an about 25 to 35 wt % functional group-containing fluoropolymer aqueous dispersion or solution). It is dried at about 100 to 150° C. for about 10 to 30 minutes. Then a second coating of a fluoropolymer of similar composition to the functional group-containing fluoropolymer, but without the functional group, is applied from aqueous dispersion or solution of about 25 to 35 wt % at a thickness of about 5 to 100 µm, preferably about 5 to 50 µm. This is dried at about 100 to 150° C. for about 10 to 30 minutes. A film is then obtained by heating to about 300° C. for about 30 minutes.

Although the properties of the substrate containing metal oxide, on the surface of which substrate a film is formed by the functional group-containing fluoropolymer of the present invention are not particularly restricted, an ordinary polymer is preferred for the substrate, and an elastomer is especially preferred. By elastomer is meant an amorphous polymer, i.e. a non-crystalline polymer, have a glass transition temperature below its use temperature, preferably below room temperature (about 20-25° C.). With a flexible substrate, the film-forming fluoropolymer of the present invention can form a thin fluoropolymer coating thereon, making it possible to form such a fluoropolymer coating without adversely affecting the flexibility of the substrate.

The present invention can be used appropriately on flexible substrates, and preferably flexible elastomer substrates, because a fluoropolymer film endowed with flexibility while provided with heat resistance and non-stickiness can be formed on the substrate. Examples of such elastomers include silicone rubber.

There is also no particular restriction as to the shape of the substrate. When the substrate is a material that constructs a roll, it may have a cylindrical shape or may be a cylinder shaped as part of the roller. When the substrate is a sheet, it may be a molded product molded into a certain shape.

The functional group-containing fluoropolymer of the present invention can be used especially appropriately on rubber (elastomer) roller-shaped substrates that contain a metal oxide.

Oxides of metals of groups III-VIII of the periodic table are preferred for the metal oxide. Examples of such metal oxides include aluminum oxide, titanium oxide, tin oxide, manganese oxide, bismuth oxide, molybdenum oxide, iron oxide, and nickel oxide. Titanium oxide and iron oxide among them are preferred. Iron oxide is an example of an especially preferred metal oxide. Red iron oxide ($Fe_2O_3$) is preferred among the iron oxides.

The particle size range of metal oxide according to this invention is from about 0.01 to 50 μm, preferably from about 0.1 to 10 μm.

The metal oxide content, as wt % of the total weight of elastomer plus metal oxide, is about 1 to 50, preferably about 3 to 45, more preferably about 5 to 40, and most preferably, about 10 to 30.

Various conventionally known methods may be used to form a film from the functional group-containing fluoropolymer of the present invention on a substrate. For example, the fluoropolymer may be applied to the desired locations on the surface as particles or particle aggregates in the form of a spray, dispersion, or slurry. It can also be mixed together with a binder or other power or liquid for other purposes in this case. Powder coating technology such as electrostatic spraying or fluidized bed coating can also be used. A fluoropolymer film is formed in intimate contact with the substrate usually by heating to a temperature higher than the melting point of the fluoropolymer particles (pressure is usually applied).

Adequate adhesive strength between the fluoropolymer and substrate is believed to develop in the present invention as a result of the functional group-containing fluoropolymer interacting with the metal oxide.

The fluoropolymer of the present invention can be applied appropriately to the fuser rolls/belts, pressure rolls/belts, and other components of printers, copiers, and the like because such application makes it possible to form a fluoropolymer coating that has flexibility while maintaining heat resistance and non-stickiness.

A second layer of fluoropolymer can be formed on the external surface of the laminate that has a functional group-containing fluoropolymer formed as a film on the substrate to which a metal oxide has been added in accordance with the present invention. In this case, the functional group-containing fluoropolymer on the substrate functions as a primer. The laminate formed in this way has good interlayer adhesion because the functional group-containing fluoropolymer adheres firmly to the substrate, and the second layer of fluoropolymer adheres to the functional group-containing fluoropolymer. A laminate in which a fluoropolymer layer is formed on the substrate with an interposed functional group-containing fluoropolymer film layer is a preferred embodiment of the present invention.

When the substrate is a roller, a laminate in which a fluoropolymer layer is formed on the roller with an interposed functional group-containing fluoropolymer film layer can be used appropriately in copiers and the like because such a roller can withstand high temperatures.

Examples of methods for forming a fluoropolymer layer on a roller with an interposed functional group-containing fluoropolymer film layer include a method of forming a functional group-containing fluoropolymer film on a roller and covering the roller with a fluoropolymer tube, a method of forming a functional group-containing fluoropolymer film on the inner surface of a fluoropolymer tube and covering the roller with the tube, and a method of forming a functional group-containing fluoropolymer layer on the inner surface of a tube by coextrusion and covering the roller with the tube when the fluoropolymer tube is produced by extrusion molding.

As described above, the functional group-containing fluoropolymer plays the role of a primer for the fluoropolymer coating because it has affinity with fluoropolymer and provides adequate adhesive strength between the fluoropolymer and the substrate as a result of interaction with the metal oxide.

From the foregoing disclosure it is seen that the present invention provides a film-forming fluoropolymer that exhibits adequate adhesion to the metal oxide containing rubber substrate, can be applied at a temperature tolerated by the substrate, and that maintains adequate heat resistance during use.

Furthermore, the present invention makes it possible to form a fluoropolymer film that can be applied at a temperature tolerated by the substrate, exhibits adequate adhesive strength with the substrate, and maintains adequate heat resistance during use.

In addition, the present invention makes it possible to provide a base material in which a fluoropolymer film endowed both with flexibility and with the chemical resistance and low friction property of fluoropolymers is formed on the surface of a flexible substrate such as an elastomer.

The present invention also makes it possible to provide a laminate in which a fluoropolymer film endowed both with flexibility and with the chemical resistance and low friction property of fluoropolymers is formed on a substrate.

The present invention provides an excellent rubber roll for copiers, printers, and other devices coated with a fluoropolymer that has flexibility while maintaining heat resistance and non-stickiness.

The present invention provides a laminate comprising a substrate that contains a metal oxide, a functional group-containing fluoropolymer coating layer formed thereon, and a fluoropolymer provided on the external surface.

EXAMPLES

The present invention is described in detail below through working and comparative examples. However, the present invention is in no way limited by these examples.

Examples 1-4 and Comparative Example 1

Production of an Aqueous Dispersion of Functional Group-Containing Fluoropolymer A clean 4-liter stainless steel polymerization reactor with horizontal stirring blades is used. A quantity of 2.2 L of pure water containing 4.9 g of added ammonium perfluorooctanoate is introduced into the reactor, and the temperature inside the synthesizer is stabilized at 85° C. after removing the oxygen from inside the system. A 0.03-MPa pressure difference is created within the system with ethane. Next, 104 g of perfluoro(ethyl vinyl ether) (PEVE) is added as a precharge fraction and the pressure is raised to 2.06 MPa with tetrafluoroethylene (TFE). Sixty-nine milligrams of ammonium persulfate (APS) initiator dissolved in water is added at this point. When the pressure drops to 0.03 MPa, polymerization is carried out while injecting APS and PEVE continuously into the polymerization reactor and maintaining a pressure of 2.06 MPa with TFE. Polymerization is conducted at a uniform temperature of 85° C. and a pressure of 2.06 MPa. A 5-wt % aqueous solution of 2,2,3,3,5,6,6,8,9,9-decafluoro-5-trifluoromethyl-4,7-dioxanona-8-en-1-yl dihydrogen phosphate (EVE-P) is added over 10 minutes at a rate of 26 mL/min after 110 minutes has elapsed. Stirring is stopped when addition of the EVE-P aqueous solution is complete, and the reaction is ended. The amounts added during the reaction are 100 mg of APS and 84 g of PEVE. After removing the residual TFE from the polymerization reactor by vacuum, the reactor is opened and a cloudy dispersion of approximately 30 wt % solids is obtained.

The solids fraction contained in this cloudy dispersion is aggregated by freezing, washed with water and acetone, and dried, yielding a white solid. According to the results of $^{19}$F-NMR analysis, this solid contains 12 wt % PEVE and 0.6 wt % EVE-P. According to DSC, the primary melting point is 269° C. and the secondary melting point is 257° C.

Production of an Elastomer (Rubber) Substrate Piece
Raw materials:
A: SE1700 Clear, made by Toray Dow-Corning
B: SE1700, made by Toray Dow-Corning
C: Red iron oxide, 100 ED, 0.1-1 μm particle size, made by Dainichiseika Color and Chemicals Mfg Co., Tokyo.

First, raw material C is uniformly mixed with A in the proportions shown in Table 1. B is then admixed in the proportions shown in Table 1. The mixture produced is placed between two sheets of FEP (fluorinated ethylene propylene, also known as TFE/HFP copolymer) film, which are in turn placed between two metal plates. After heating for 30 minutes at 120° C. and applying approximately 0.5 kg/cm² (50 kPa) of pressure, a rubber substrate piece is obtained Production of Primer The aforementioned fluoropolymer aqueous dispersion of the present invention, a surfactant (Triton® X-100), and methyl cellulose thickener are uniformly mixed in the proportions shown below, the mixture is passed through a 300-mesh SUS screen, to make fluoropolymer aqueous primer for rubber.

Weight Ratios

| | |
|---|---|
| Fluoropolymer aqueous dispersion of the present invention: | 90.4 parts |
| Surfactant: Triton X-100 | 1.6 parts |
| Methyl cellulose aqueous solution (methyl cellulose 4.8 wt %) | 8.0 parts |

Production of Test Plates

The primer prepared as described above is applied 3-5 μm thick and dried (125° C. for 20 min) on the surface of the rubber substrate pieces produced as described above by an ordinary application method (such as spray coating or immersion). A Fluoropolymer topcoat (40 wt % solids, composition shown below) is next applied and dried at 125° C. for 20 minutes to yield a 25 μm thick coating. A film is then obtained by heating the coated substrate for 30 minutes at 300° C.

| Composition of Fluoropolymer Topcoat | |
|---|---|
| Ingredient | Weight % |
| 1) Tetrafluoroethylene/hexafluoropropylene (FEP) Dispersion (55.5 wt % solids) | 56.62 |
| 2) Triton X-100 | 0.57 |
| 3) Glycerin | 0.50 |
| 4) Film-forming acrylic polymer | 16.49 |
| 5) Diethylene glycol monobutyl ether | 2.23 |
| 6) Oleic acid | 1.13 |
| 7) Aromatic hydrocarbon | 2.72 |
| 8) Triethanol amine | 4.22 |
| 9) Methyl cellulose aqueous solution (4.8 wt % methyl cellulose) | 2.70 |
| 10) Cerium (III) 2-ethylhexanoate | 0.54 |
| 11) Deionized Water | 12.28 |

Ingredients 2, 5, 6, 7, 8, and 10 are premixed. Then 1, 11, 3, 4, and 9 are mixed in order, and lastly the premixture is added.

Adhesion Test

Each of the films obtained as described above is submitted to a 90-degree peel test at a test width of 10 mm and a peel rate of about 50 mm/min in accordance with the peel test method described on page 239, section 5.5.4 of Modern Fluoropolymer Coating Processing Technology (Epotech K.K., Tokyo, published 1988). Separation of the rubber layer and the primer is judged as "fail". Separation or tearing within the rubber substrate is judged as "pass". Results are summarized in Table 1 together with the peel strength and location of separation (peel location).

TABLE 1

| | | Example 1 | Example 2 | Example 3 | Example 4 | Comparative example 1 |
|---|---|---|---|---|---|---|
| Substrate | A:B | 10:1 | 10:1 | 10:1 | 10:1 | 10:1 |
| composition | (A + B):C | 90:10 | 85:15 | 80:20 | 70:30 | 100:0 |
| Peel strength (g/cm) | | 420 | 400 | 380 | 380 | 40 |

TABLE 1-continued

| | Example 1 | Example 2 | Example 3 | Example 4 | Comparative example 1 |
|---|---|---|---|---|---|
| Peel location | Rubber layer broke down | Rubber layer broke down | Rubber layer broke down | Rubber layer broke down | Between primer and rubber |
| Adhesiveness test | Pass | Pass | Pass | Pass | Fail |

Example 5

A sample is prepared as described in Example 1, above. This film is evaluated based on the tape adhesion-checkerboard (cross hatch) test method described on page 236, section 5.5.1 of Modern Fluoropolymer Coating Processing Technology (cited above). No peeling, that is, no detachment of the coating is found.

Example 6

A primer prepared as described above in Example 1 is applied and dried on a silicone rubber roll that contains red iron oxide, made according to the general formula given for making the test plates, above. The roller is covered with a heat-shrinkable tube, the wall of the tube being 50 μm thick, made of PFA polymer similar to that of Example 1. A heat-fused coating is formed by applying heat (330° C. for 10 minutes) to shrink the tube to bring the tube into intimate contact with the rubber roll and to establish good adhesion by interaction of the functional groups with the metal oxide in the rubber. When a 10 mm cut is made in this coating and a simple peel test is conducted by pulling the coating slowly by hand, the rubber layer brakes down, showing good adhesion.

What is claimed is:

1. A laminate, comprising a polymer substrate containing a metal oxide, and a functional group-containing fluoropolymer coating layer, wherein the melting point of the functional group-containing fluoropolymer is 220 to 280° C.

2. The laminate of claim 1, wherein the functional group-containing fluoropolymer is a phosphate group-containing fluoropolymer.

3. The laminate of claim 2, wherein the functional group-containing fluoropolymer is a tetrafluoroethylene/trifluorovinyl ether group-containing dihydrogen phosphate ester compound/fluorine-containing comonomer copolymer resin.

4. The laminate of claim 3, wherein the fluorine-containing comonomer is perfluoro(alkyl vinyl ether) or perfluoroalkyl vinyl.

5. The laminate of claim 3, wherein the trifluorovinyl group-containing dihydrogen phosphate ester compound (1) is the dihydrogen phosphate ester

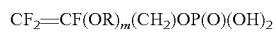

$CF_2\!=\!CF(OR)_m(CH_2)OP(O)(OH)_2$     (1)

where R is a $C_1$-$C_{20}$ fluorinated alkylene group, m is an integer from 1 to 10, and R may be the same or different when m is 2 or greater.

6. The laminate of claim 4, wherein said comonomer contains about 3 to 15 mol % of the perfluoro(alkyl vinyl ether) component or perfluoroalkyl vinyl component.

7. The laminate of claim 1, wherein the functional group-containing fluoropolymer is a composition comprising a functional group-containing fluoropolymer and a fluoropolymer without functional groups.

8. The laminate of claim 7, wherein the functional group-containing fluoropolymer is about 30 to 80 wt. % of the total composition.

9. The laminate of claim 7, wherein the fluoropolymer without functional groups is a copolymer of tetrafluoroethylene with at least one monomer selected from the group consisting of perfluoro(alkyl vinyl ether) and perfluoroalkyl vinyl.

10. The laminate of claim 9, characterized in that the fluoropolymer without functional groups contains 3 to 15 mol % of said at least one monomer.

11. The laminate of claim 1, wherein the substrate comprises an elastomer.

12. The laminate of claim 11, wherein the elastomer is silicone rubber.

13. The laminate of claim 1, wherein the metal oxide is iron oxide.

14. The laminate of claim 13, wherein the iron oxide is red iron oxide.

15. The laminate of claim 1, wherein the substrate is a roller.

16. The laminate of claim 1, provided with fluoropolymer on the external surface thereof.

17. A laminate, comprising a polymer substrate containing a metal oxide, and a functional group-containing fluoropolymer coating layer, wherein the melting point of the functional group-containing fluoropolymer is 220 to 280 C. and said functional group-containing fluoropolymer is a core/shell polymer composition, said core being fluoropolymer without functional groups, and said shell being functional group-containing fluoropolymer.

* * * * *